Figure 7:
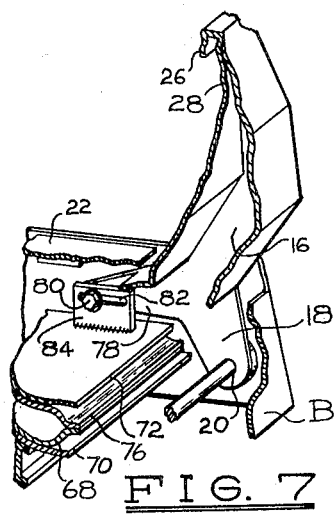

June 12, 1962  J. GROSS  3,038,203
HEAVY DUTY TIRE REPAIR MACHINE
Filed Feb. 23, 1960  2 Sheets-Sheet 1

INVENTOR.
JULES GROSS
BY
Leon Arthurs agent

June 12, 1962 J. GROSS 3,038,203
HEAVY DUTY TIRE REPAIR MACHINE
Filed Feb. 23, 1960 2 Sheets-Sheet 2
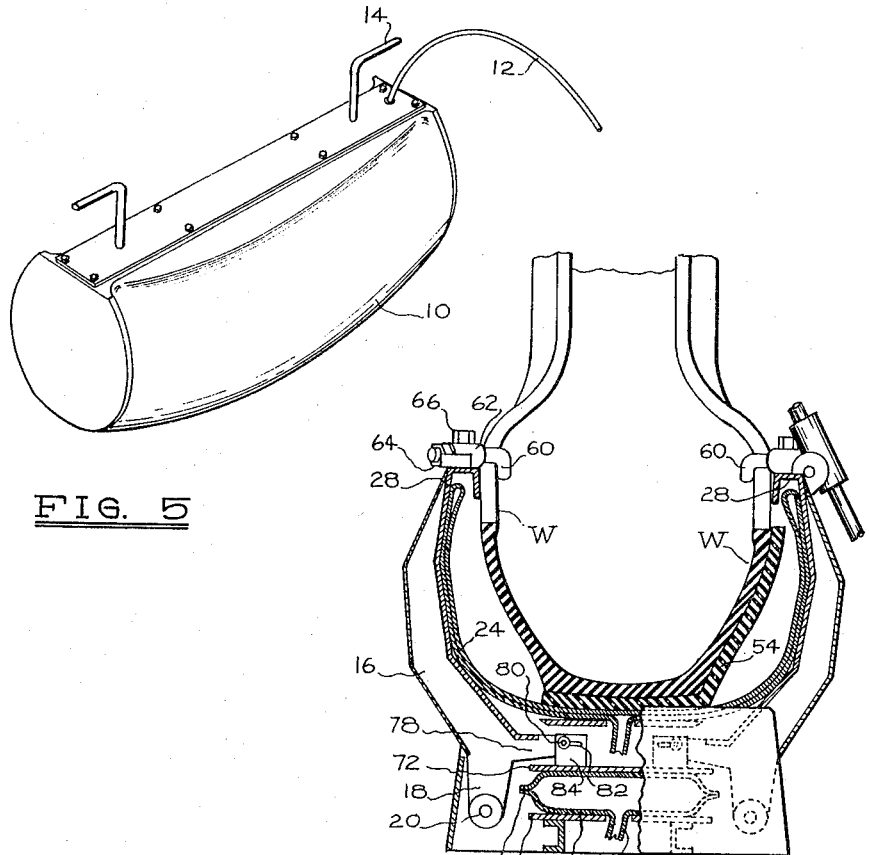
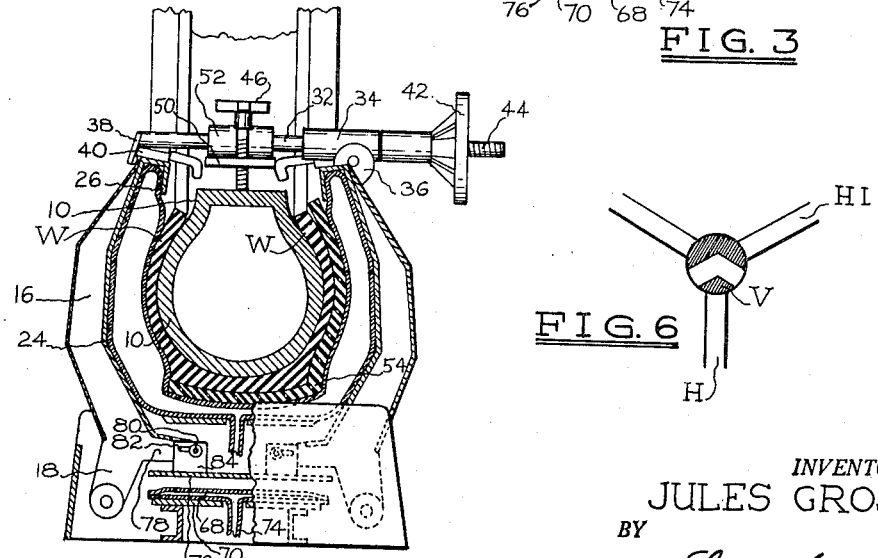
INVENTOR.
JULES GROSS
BY
Leon Arthurs
agent

United States Patent Office 3,038,203
Patented June 12, 1962

3,038,203
HEAVY DUTY TIRE REPAIR MACHINE
Jules Gross, 630 Vesta Drive, Toronto, Ontario, Canada
Filed Feb. 23, 1960, Ser. No. 10,375
6 Claims. (Cl. 18—18)

The invention relates to apparatus for vulcanising repairs in tire casings and is of particular utility in connection with heavy truck or tractor tires. Machines of this type often include a solid tire-conforming mandrel which can be fitted inside a segment of the tire casing and support it during vulcanisation. Such machines may also include a composite mold formed of mold sections which may be clamped together around the tire segment and which may be movable to open such mold for insertion and removal thereof. Both mandrel and mold may be adapted to apply heat and pressure to the tire segment for vulcanisation of the repair in a known manner.

In order to insert the solid mandrel into the tire and also to remove it, it is necessary to separate the walls of the tire casing and for this purpose a further machine is necessary, many varieties of which are available.

However this process is unsatisfactory and time-consuming since it involves at least three separate operations in the two machines, namely, the insertion of the mandrel, the vulcanisation of the repair and the removal of the mandrel.

Furthermore this sequence of operations involves considerable handling of the tire casing into and out of each machine in turn, which handling is particularly aggravated by the presence of the mandrel, which may weigh 50 lbs. or more, within the tire casing, and thus require two or more men on each occasion.

These and other difficulties are of course greatly magnified in the case of heavy tire casings for example truck and tractor tires.

Accordingly it is an object of the invention to provide a tire repair machine of the foregoing type which is quick, economical and efficient in use and is also relatively simple and economical to make and in which handling of the tire is simplified and reduced.

More specifically the invention seeks to provide such a tire repair machine having the foregoing advantages in which the walls of the tire may be separated for insertion and removal of the mandrel and also in which the tire may be subjected to heat and pressure for vulcanisation, without handling or relocation of the tire.

The invention seeks to achieve the foregoing and other advantages which will appear from the following description of a preferred embodiment of the invention by providing in a tire repair machine having mold sections forming a composite mold, at least one of said sections being movable between open and closed positions respectively for the reception or release of a segment of a tire casing and for clamping said segment about a contained mandrel, the combination of claws associated with said mold sections for releasably engaging the walls of said segment and mechanism operable to effect separation of said walls by said claws contemporaneously with the movement of said movable mold section towards one of its positions aforesaid.

Figure 1:
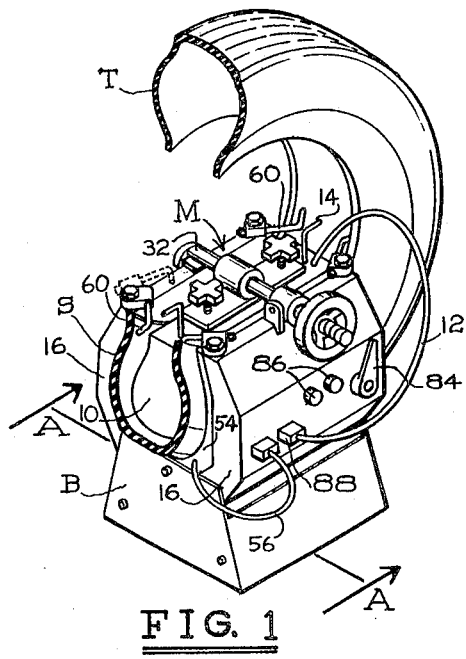
Figure 2:
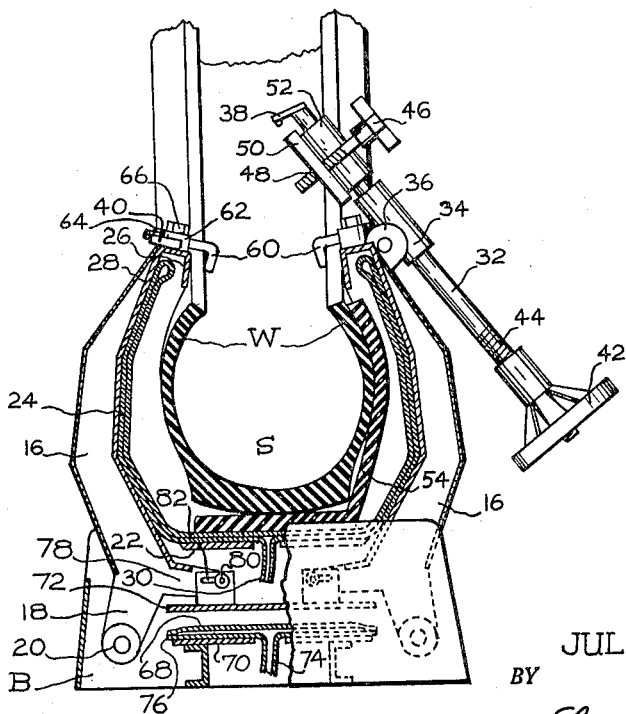

A preferred embodiment of the invention will now be described by way of example only with reference to the following drawings in which like reference devices refer to like parts of the invention throughout the several views and in which:

FIG. 1 is an isometric view of the instant tire repair machine showing a tire in position and cut away for the sake of clarity, FIG. 2 is a sectional side elevation of the machine shown in FIG. 1 along the line A—A with a tire casing in position therein prior to the insertion of the mandrel, FIG. 3 is a sectional side elevation corresponding to FIG. 2 showing the tire casing with its walls separated for the insertion (and removal) of the mandrel, FIG. 4 is a sectional side elevation corresponding to FIG. 2 showing the tire casing with the mandrel in position therein and the mold members clamped in position and applying pressure thereto during molding, FIG. 5 is an isometric view of the mandrel shown in isolation, and FIG. 6 is a schematic diagram of a suitable pressure control device.

FIG. 7 is an isometric view of part of the apparatus shown in FIG. 1 cut away to show details of the internal mechanism.

The instant tire repair machine herein illustrated as a preferred embodiment of the invention will be seen to be essentially comprised of a mold M mounted in an upturned position on a base B so that a tire casing T can be simply raised and placed therein with the segment S thereof requiring repair in the lowest position. The machine also comprehends a solid mandrel 10 (shown separately in FIG. 5) for supporting the interior of segment S of tire casing T during repair in a known manner, heated, for example by an integral electric heating element (not shown), electric cable 12 connecting the same to any suitable supply and is provided with handles 14 by which it may be moved by an operative.

In order that segment S of tire casing T can be placed within mold M as stated, mold M is provided with two movable mold sections 16 attached to arms 18 which are in turn rockably mounted in base B at journals 20 rendering them swingable away from and towards one another to vary mold M between open and closed positions for respectively receiving segment S therein and for forming a composite mold around the same. In this preferred embodiment mold M also includes a fixed mold section 22 attached to base B and extending between movable mold sections 16.

It is noteworthy that arms 18 are attached to mold sections 16 at a substantial angle thereto and that they are of substantial length, thus locating mold sections 16 at a distance from journals 20. In this manner mold sections 16 may be moved a substantial distance apart from one another without distorting the general shape of mold M as a whole to such an extent as to render it incapable of effectively molding a tire segment. This feature of the instant apparatus increases the scope of its operation over a wide range of tires thus in turn rendering it more economical. Furthermore it is noteworthy that there is a considerable overlap between movable mold sections 16 and fixed mold section 22 for the same purpose namely to maintain the general shape of mold M over a wide range of tire sizes.

Mold M is provided with means for applying pressure to the exterior of segment S of tire casing T, comprised of bladder 24 contained within and supported by fixed mold section 22 and movable mold sections 16 the latter being provided with flanges 26 at their free edges 28 retaining bladder 24 therewithin. Bladder 24 may be inflated by compressed air supplied thereto from any suitable source through hose 30 and is retained against expansion outwardly by flanges 26 aforesaid.

Mold sections 16 when in their closed position may be drawn together and clamped around segment S of tire casing T containing mandrel 10, by means of jack screw 32 freely slidable in tube 34 swingably mounted between brackets 36 fixed to free edge 28 of a mold section 16 for swinging towards and away from the other mold section 16. Hook 38 is attached to one end of jack screw 32 for inter-engagement with abutment 40 on the free edge 28 of the other mold section 16. Jack screw 32 may be drawn through tube 34 for clamping mold sections 16 together by rotation of hand wheel 42 along threaded portion 44 of jack screw 32. In certain cases it may be found necessary or desirable to press segment S downwardly into mold M, for example, to resist inter alia the expulsive force which may in some instances be developed by bladder 24. Accordingly downward pressure may be applied to mandrel 10 by means of hand screws 46 running in threaded holes 48 in bracket 50, which is itself slidably mounted on jack screw 32 by means of collar 52.

As far as the specific vulcanizing function of this preferred form of the invention is concerned the foregoing apparatus is generally sufficient for this purpose and will, in conjunction with a mandrel 10 contained thereby apply heat and pressure to a segment S of a tire casing T as desired. In certain cases it may be found desirable to apply heat to both inside and outside of segment S and accordingly heating pad 54 may be used on the outside thereof. Such pad 54 may be formed of any suitable type of rubber, for example rendering it relatively easily deformable to procure substantial conformation to the shape of segment S and may contain an electric heating element (not shown) connected to a suitable source of supply by electric cable 56.

In addition to the apparatus already described however, this preferred embodiment of the invention incorporates means for separating walls or sidewalls W of segment S contemporaneously with the movement of the movable mold sections 16 to facilitate insertion and removal of mandrel 10 while segment S is in position within mold M.

Accordingly claws 60 are provided for engaging and grasping sidewalls W and they are associated with movable mold sections 16 for movement in unison therewith between their two positions aforesaid, being screwed into bearing blocks 62 thus providing a certain degree of adjustment for the orientation of claws 60, lock nuts 64 being provided to lock them in any desired position. Bearing blocks 62 are in turn swingably mounted to free edges 28 of mold sections 16 by means of bolts 66 thus enabling claws 60 to be swung into and out of engagement with sidewalls W of segment S when segment S is in position in mold M with mold sections 16 in their closed position respectively abutting said sidewalls W.

In addition operating mechanism is provided for moving mold sections 16 apart from one another towards their open position thus releasing said sidewalls W. This operating mechanism will be seen to comprise inflatable bag 68 located between a stationary lower plate 70 fixed to base B and an upper plate 72 which is movable in a vertical plane in response to inflation and deflation of bag 68, which may itself be connected to any suitable source of supply by hose 74. In order to resist substantial expansion in a horizontal plane bag 68 is of pillow type construction and is reinforced along its edge zones as at 76, expansion being thus more or less confined to a substantially vertical plane. Vertical movement of upper plate 72 is communicated to cranks 78 by trunnions 80, fixed to cranks 78 and running in slots 82 formed in ears 84 attached to upper plate 72. Cranks 78 are in turn fixed to arms 18 for swinging in unison therewith about journals 20, whereby vertical movement of plate 72 is communicated to mold sections 16 as a swinging movement thereof, in the manner most readily understood from FIG. 7.

In order to control inflation and deflation of bag 68, and also of bladder 24, suitable control mechanism is provided as shown schematically in FIG. 6. Hose H may be considered as either hose 30 or hose 74 as desired and leads from either bladder 24 or bags 68 respectively to valve V. From valve V a second hose H1 leads to a supply of compressed air at a suitable pressure. Valve V has at least 3 positions, one of said positions permitting inflation, another position permitting deflation and a third position in which no air can flow either into or out of hose H.

A cycle of operations may be started with mold sections 16 in their open position following the completion of a previous repair. Heating pad 54, if required, may be placed in position in mold M after which tire case T is lifted and placed in position with segment S thereof between movable mold sections 16 and resting on fixed mold section 22. Movable mold sections 16 may then be swung together about journals 20 from their open position towards their closed position around segment S and abutting sidewalls W as shown in solid lines in FIG. 2.

When mold sections 16 are in their closed position bearing blocks 62 may be swung about bolts 66 to bring claws 60 towards one another over segment S into engagement with walls W thereof. The mechanism for moving mold sections 16 may then be operated by admitting compressed air to bag 68 causing plate 72 to move upwardly carrying with it trunnions 80 running in slots 82. Trunnions 80 will in turn cause cranks 78 to swing upwardly about journals 20 carrying with them arms 18 and thus moving mold sections 16 apart from one another towards their open position. The operation of this mechanism will move claws 60 apart from one another contemporaneously with the aforesaid movement of mold sections 16 thus separating walls W of segment S and thereafter the pressure may be maintained thus holding walls W in their separated position shown in FIG. 3.

Mandrel 10 is then lifted by handles 14 and lowered between walls W into segment S after which pressure in bag 68 may be simply released permitting mold sections 16 and claws 60 to be drawn together by the walls W of segment S returning to their normal conformation. When mold sections 16 are in their closed position once more claws 60 may be released from walls W and swung away from one another though this may not always be necessary.

Jack screw 32 may then be swung between brackets 36 to bring hook 38 into engagement with abutment 40 and mold sections 16 may then be drawn together and clamped around segment S by rotation of hand wheel 42 thus drawing jack screw 32 through tube 34.

Segment S may then be pressed downwardly by bringing hand screws 46 into engagement with the upper surface of mandrel 10, and thereafter screwing them down thus forcing it downwardly into segment S. When jack screw 32 and hand screws 46 are suitably adjusted compressed air may be admitted through hose 30, to bladder 24 thus applying pressure to the exterior of segment S and compressing it against mandrel 10, as shown in FIG. 4. Simultaneously heat may be applied both by mandrel 10 and also by heating pad 54 and vulcanisation will proceed in the usual manner.

When vulcanisation is completed heating may be discontinued and pressure in bladder 24 released. Hand screws 46 may then be loosened and jack screw 32 may be loosened and swung to free hook 38 from abutment 40.

Claws 60 may then be once more swung over segment S into engagement with walls W thereof. Compressed air may then again be supplied to bag 68 for operating mold sections 16, moving them apart from one another and contemporaneously moving claws 60 apart thus separating walls W.

Mandrel 10 may then be lifted and removed from segment S, after which pressure in the aforesaid operating mechanism is released permitting walls W to draw mold sections 16 and claws 60 together once more. Claws 60 may then be swung out of engagement with walls W as described and mold sections 16 may then be moved apart from one another again and tire casing T may be readily removed from mold M.

Obviously the foregoing operations can most advantageously be carried out with the aid of convenient controls. Accordingly valve mechanisms corresponding to valve V in respect of both bladder 24 and air bag 68 can usefully be incorporated in one of mold sections 16 and operated as by handle 84. Similarly electrical control mechanism for energizing and controlling the temperature of mandrel 10 and heating pad 54 can also be incorporated in the same mold section 16, operated as by switches 86 and connected to the respective electrical cables 12 and 56 by conventional plugs and sockets, as at 88.

The foregoing is a preferred embodiment of the invention and is hereby described by way of example only. I do not limit myself to the specific construction illustrated other than as specified in the appended claims which are intended to include all modifications which do not depart from the spirit of my invention.

What I claim as my invention is:

1. Machinery for repairing tires comprising interconnected mold sections forming a composite segmental mold for containing a segment only of a said tire; journals on which at least one of said mold sections is journalled for swinging to vary said mold between an opened position for the reception and release of a tire segment and a closed position with said mold sections abutting substantially the entire exterior surface of each side-wall of the said tire segment; mechanism operable on said journalled section to swing it on its journals for varying said composite segmental mold between its two positions aforesaid, and claws attached to the mold sections of said composite segmental mold for releasably engaging said side-walls by their beads; said claws being separable by said composite segmental mold to spread said side-walls for the reception of a solid mandrel while the said composite segmental mold is being varied between its two positions as aforesaid.

2. The apparatus set forth in claim 1 wherein said claws are engageable with and releasable from said side-walls when the said composite mold is substantially in its closed position about said segment.

3. The apparatus set forth in claim 1 wherein the said composite mold is comprised of at least two mold sections carrying the claws aforesaid; at least one of said mold sections being swingably movable away from and towards the other between said open and closed mold positions, and said claws being engageable with and releasable from said side-walls when said mold sections are in substantially closed position about the said segment.

4. Machinery as set forth in claim 1 including a base and wherein the said composite segmental mold includes two mold sections which are journalled on said base for swinging towards and away from each other to vary the said composite segmental mold between its two said positions; said mechanism being operative on both said mold sections for swinging them as aforesaid.

5. Machinery as set forth in claim 1 including a base and wherein said composite segmental mold includes two sections which abut the said side-walls and are journalled on said base for swinging away from and towards each other for opening and closing said composite segmental mold; said mechanism being operative on both said mold sections for swinging them as aforesaid, and said claws being respectively mounted on said side-wall abutting sections for engaging the beads of the side-walls respectively abutted thereby.

6. Machinery for repairing tires including a base; a composite mold including a pair of mold sections journalled on said base for swinging away from each other to an opened position of the said composite mold for the reception and release of a tire segment, and to a closed position of the said composite mold about said tire segment with each said section abutting substantially the entire exterior surface of a side-wall of the said segment; claws attached to each said mold section for releasably engaging the side-walls of the segment; a crank for swinging each said mold section, and mechanism for operating said crank to swing said mold sections and so to vary said composite mold between its opened and closed positions; said claws being separable by said mold sections to spread said side-walls for the reception of a solid mandrel while the said composite mold is being varied between its two positions aforesaid.

References Cited in the file of this patent

UNITED STATES PATENTS

| | | |
|---|---|---|
| 2,904,842 | Alm | Sept. 22, 1959 |
| 2,939,677 | Duerksen | June 7, 1960 |
| 3,000,615 | Alm | Sept. 19, 1961 |